United States Patent [19]

Dodaro

[11] Patent Number: 5,322,188
[45] Date of Patent: Jun. 21, 1994

[54] LID DISPENSING

[76] Inventor: Antonio Dodaro, 5663 Del Prado Dr., No. 249, Tampa, Fla. 33617

[21] Appl. No.: 782,988

[22] Filed: Oct. 28, 1991

[51] Int. Cl.$^5$ ............................................. B65G 59/00
[52] U.S. Cl. .................................. 221/223; 221/297; 221/298; 221/1
[58] Field of Search ..................... 221/1, 92, 131, 289, 221/221, 223, 297, 298, 351; 53/305, 309

[56] References Cited

U.S. PATENT DOCUMENTS

| | | | |
|---|---|---|---|
| 3,122,267 | 2/1964 | Edwards | 221/223 |
| 3,838,792 | 10/1974 | Porter | 221/307 |
| 4,375,144 | 3/1983 | Moller | 53/309 |
| 4,436,222 | 3/1984 | Taylor et al. | 221/223 |
| 4,874,112 | 10/1989 | Mulder et al. | 221/1 |
| 4,948,011 | 8/1990 | Mueller et al. | 221/1 |
| 5,012,952 | 5/1991 | Franz | 221/221 |

*Primary Examiner*—H. Grant Skaggs
*Attorney, Agent, or Firm*—Charles A. McClure

[57] ABSTRACT

Apparatus and method for dispensing lids, such as plastic lids for soft-drink cups, one-by-one from a stack of such lids supported initially underneath by resting on the lower of two pairs of members adapted to grip and ungrip individual lids, the upper pair being in ungripping configuration and the lower pair being in ungripping but supporting configuration. Operating the method, as by depressing a handle, causes the member pairs first to grip, respectively, the bottommost lid and the next overlying lid, and then to lower the bottommost lid while gripped, as the next overlying lid remains at its original level gripping and thereby supporting the stack of overlying lids. Further operation causes the bottommost lid to be ungripped by the lower pair of members to fall unsupported, whereupon that pair of members returns empty to its original level in ungripping but supporting configuration, then the upper pair of members ungrips the next lid whereupon the stack settles the thickness of a lid onto the lower pair of gripping-ungripping members in ungripping supporting configuration, completing a cycle of lid dispensing.

12 Claims, 4 Drawing Sheets

LID DISPENSING

TECHNICAL FIELD

This invention relates to means and methods for dispensing lids one-by-one, such as ordinary plastic lids for plastic drinking cups.

BACKGROUND OF THE INVENTION

Beverages are commonly dispensed into paper or plastic drinking cups having a beaded or rolled top edge adapted to fit disengageably into the downturned peripheral skirtlike flange of a cover or lid, which may be flared slightly outward to facilitate such engagement. A lid is especially useful when a dispensed beverage is to be consumed elsewhere and risks contamination or spillage in transit.

Dispensing machines have been devised to apply lids to drinking cups into which beverages have been dispensed, such as by von Sydow and McCoy in U.S. Pat. No. 1,994,736; by West in U.S. Pat. No. 3,864,898; or Credle in U.S. Pat. No. 4,319,441. However, doing so is a complex operation, which may malfunction-or tend to increase the beverage price.

Consequently, beverages are more often dispensed into uncovered cups, and lids are applied—or are supplied to be applied—by hand. Such lids are usually supplied in nested stack form, convenient for shipping but not convenient for dispensing. Frequently the lids are spread out on a counter, as in a shallow container, whereupon customers can choose and remove one or more lids. Such an increase in customer convenience favors a corresponding increase in wastage, as some customers (or their children) will toy with the lids, spilling and dirtying them, and others will take more lids than they do cups.

There is a need for even better dispensing of such cup lids for manual capping use and maintaining their as-supplied sanitary state. My invention addresses that need and meets it successfully.

SUMMARY OF THE INVENTION

A primary object of the present invention is to dispense in an improved manner such lids as are commonly used upon drinking cups.

Another object of this invention is to dispense such lids so as to maintain their individual as-supplied sanitary condition.

A further object of the invention is to control dispensing of such lids so as to reduce wastage.

In general, the objects of the present invention are attained by dispensing cup lids one-by-one from a nested stack of such lids, by a controlled sequence of lateral gripping and ungripping of lids and intermittent support of the stack from underneath.

More particularly, the invention supports the stack at a given level from underneath, laterally grips the bottommost and next overlying lids individually, lowers the bottommost lid and the support level, ungrips the bottommost lid to fall free, restores the given support level, ungrips the next lid, enabling the stack to settle to the support level, completing a dispensing cycle, ready to re-cycle.

Apparatus for practicing the method of this invention includes a magazine adapted to hold a stack of lids slidable vertically, first gripping means adapted to grip and to ungrip the bottommost lid laterally, and second gripping means adapted to grip and to ungrip laterally the lid next overlying the bottommost lid, in a sequence of dispensing steps. The first gripping means is further adapted to underlie partially and thereby support the bottommost lid and whatever other lids in such stack are resting thereon, and adapted to move downward from a given level, to remove such support, and to return to such given level. The apparatus of the present invention includes means sequencing the action of the foregoing means to dispense the lids one-by-one from the bottom of the stack, as a manually powered semi-automatic cup-dispensing means.

DESCRIPTION OF THE INVENTION

Figure 1:
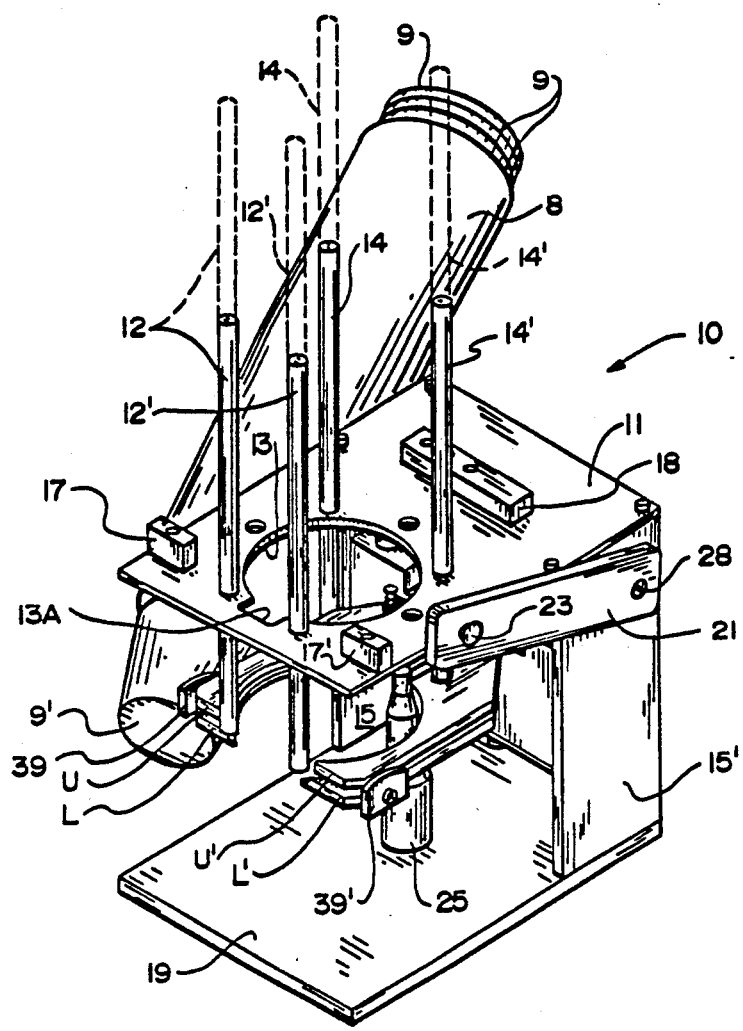
FIG. 1 is a perspective view of apparatus of this invention, plus optional cup-dispensing means—omitted from subsequent views.

FIG. 1 shows, in perspective, dispensing apparatus 10 of this invention, adapted to practicing the one-by-one dispensing method of the invention. Rectangular base 19 supports all other components on it by means of left and right partial sidewalls 15, 15' and horizontal platform 11 mounted thereon. Most prominent are two pairs of magazine rods spaced about opening 13, which is circular except for notch 13a extending forward and extending to the left and right of the centerline (not indicated) to accommodate the width of a pulltab commonly protruding from plastic lids for drinking cups.

Front pair 12, 12' of magazine rods flank notch 13a, whereas rear pair 14, 14' of such magazine-defining rods are spaced somewhat further apart but less than the lid diameter, of course. Small bosses 17, 17' rise from the left and right front corners of the platform, while larger boss 18 is located about halfway from side to side and between opening 13 and the rear edge of the platform. Although no lids are shown in this view, so that other components can be seen, it will be understood that the magazine rods slidably support a stack of lids nested with their tabs extending to the front so as to pass downward through notch 13a for dispensing, as described later.

Sidewall 15' carries pivot pin 28 for handle 21, which extends forward and upward in the illustrated rest position and has knob 23 in its outward surface near the front at about the level of the platform. The handle is pivotable downward through a limited arc to deflected position (not shown) so as to produce a sequence of steps resulting in dispensing lids one-by-one from the bottom of the magazine. Upstanding frustoconical rod 25 functions as a fixed cam upon such deflection. Visible about halfway between the platform and the base are upper left U and right U' halves, and lower left L and right L' halves, of lid-gripping means. Each set of both halves combines into substantially a yoke shape (in plan), each terminating arcuately and in alignment with the cylindrical magazine overhead. The arcuate inner edge of the lower gripping means is flanged along its lower inner edge, so that in rest position a lid lies only on the flange and spaced somewhat from an arcuate nearly vertical but slightly canted edge, tapering downward to center the stack.

FIG. 1 also shows optional cup-dispensing means in the form of obliquely mounted cylinder 8 laterally surrounding stacked cups 9. The rims of several cups at the top of the stack are visible outside cylinder at the top. The base of the bottommost cup 9' protrudes out the bottom of the cylinder, where it can be gripped manually and be removed—lowering the rest of the stack accordingly. As noted, the cup-dispensing means is omitted from subsequent views, because no cup-dispensing means is essential to the present invention, and other forms of cup-dispensing means could supersede that of FIG. 1.

Figure 2:
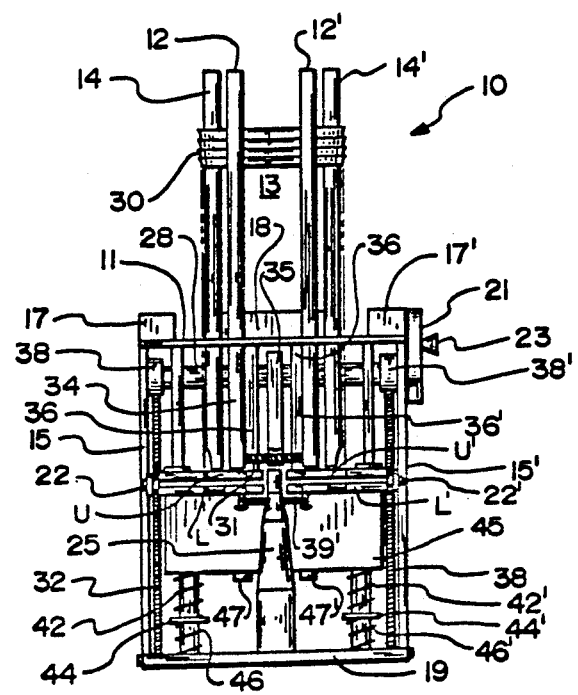
FIG. 2 is a front elevation of that apparatus in rest position but with the stack of cups cut away in part to reveal the interior.

FIG. 2 shows lid-dispensing apparatus 10 in front elevation, less the cup-dispensing cylinder. Components identified in previous description of FIG. 1 are not necessarily mentioned here but will be understood. Some lids 30 are shown near the top of the magazine but their stack is omitted elsewhere to reveal components behind it. The vertical scale of the middle third of the view is stretched out because of the numerous components requiring illustration therein. Left and right halves L and L' of the lower gripping means, mounted on vertical pivot pins (27, 27'—see FIGS. 4A, 4B) on shoulder portions of block 45, have horizontal bias spring 39 behind vertical fixed cam 25 biasing them together. The block is mounted slidably on posts 42, 42' upstanding from base 19 and surrounded by helical compression springs 46, 46' with collars 44, 44' at the desired minimum level for the bottom of the block. Left and right halves U and U' of the upper gripping means, are mounted on vertical pivot pins (37, 37'—see FIGS. 4A, 4B, 5A, 5B) within housings 36, 36' from platform 11 overhead, are biased together by horizontal helical spring 31 visible above the top of fixed cam 25. Movable cam 35 (whose middle lobe is visible here) is carried on handle pivot pin 28 and also affects the positions of the gripping means, as shown and described in detail below. Left and right long vertical helical springs 32 and 38 bias the handle upward by connection to the back of collars 38 and 38' at opposite ends of pivot pin 28.

Viewed closely, FIG. 2 also shows that, in the rest position of dispensing apparatus 10, the respective gripping means are held out of contact with upstanding fixed frustoconical cam 25. This same relationship is shown on a larger scale in the first of a series of subsequent sequential views. Meanwhile, in intervening views, the dispenser is shown from the side, and then its movable cam structure is shown in further detail, in sequential positions in successive views. Stops 22, 22' affixed to the outer edges of the front end of lower gripping means L and extending upward to flank the outer edges of the front end of upper gripping means L in the rest position ensure that the upper gripping means will not spread apart appreciably more in the rest position than the lower gripping means does.

Figure 3:
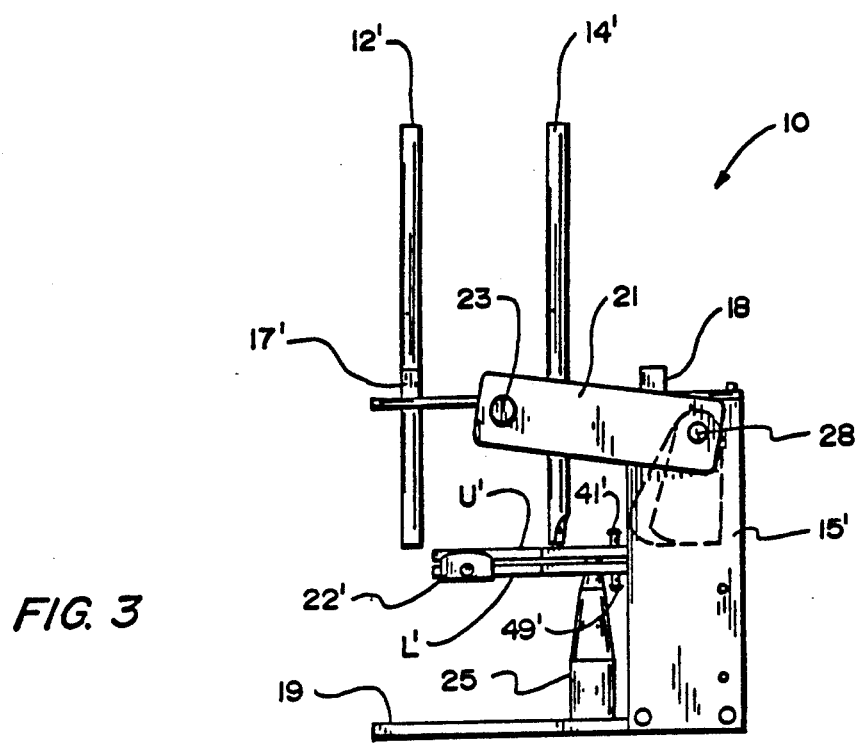
FIG. 3 is a side elevation of that apparatus in rest position.

FIG. 3 shows same dispensing apparatus 10, from its left—which was at the right side of a person facing it in the preceding views. Stop 22' is clearly visible secured to the front part of the left half of lower gripping means, but otherwise the components shown in this view are illustrated in previous views.

Figures 4A, 4B:
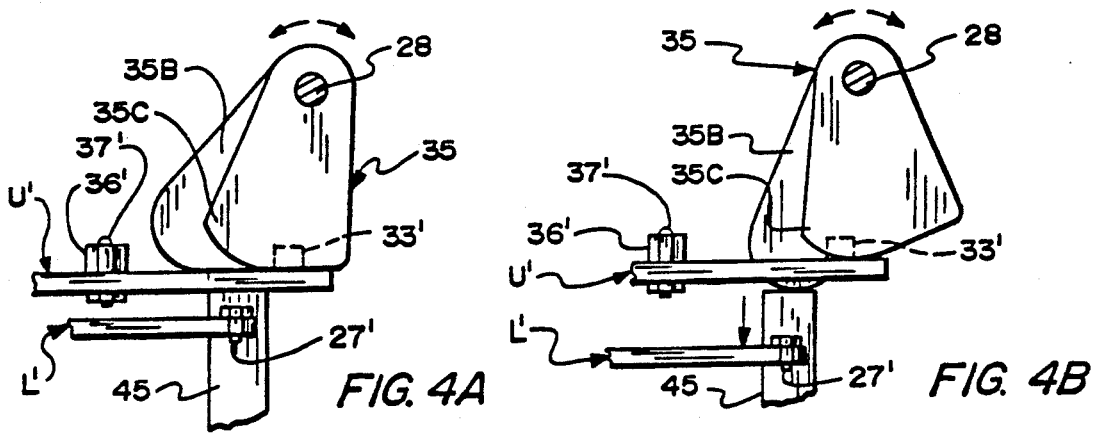
FIG. 4A is a fragmentary side elevation of cam-related components of the same apparatus in rest position.
FIG. 4B is a fragmentary side elevation similar to FIG. 4A but with the cam-related components in deflected position.

FIGS. 4A and 4B show, in fragmentary side elevation, movable cam 35 on pivot pin 28, first (FIG. 4A) in the rest position as with the handle up, and then (FIG. 4B) in the deflected position (handle down). Associated components are shown fragmentarily also.

Figures 5A, 5B:
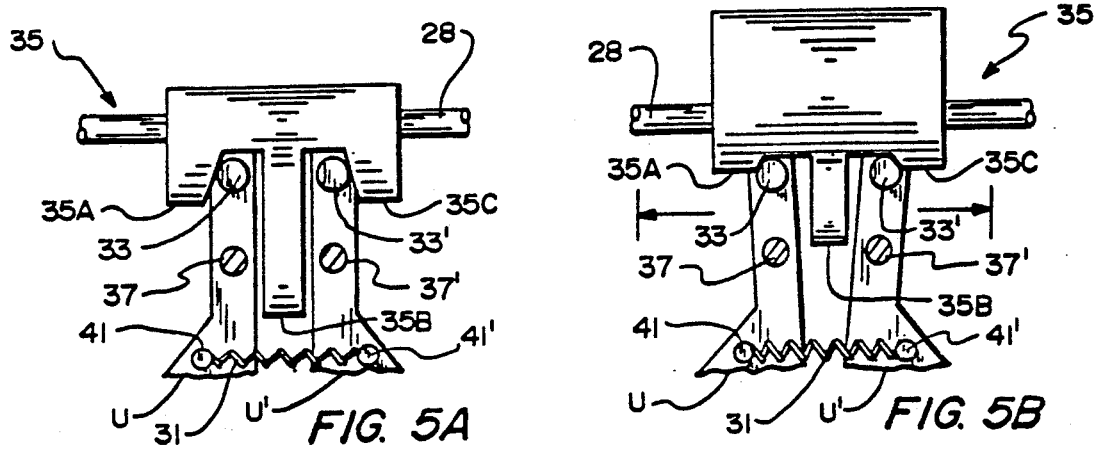
FIG. 5A is a fragmentary multi-level sectional plan of the same apparatus showing the cam-related components in rest position.
FIG. 5B is a fragmentary plan section similar to FIG. 5A but with the cam-related components in deflected position.

FIGS. 5A and 5B show movable cam 35 and associated components in plan, first (FIG. 5A) in rest position and then (FIG. 5B) in the same deflected condition as shown from the side in FIG. 4B. These views show that the cam has a long middle lobe 35b flanked by short oblique side lobes 35a and 35c.

In the rest position of FIGS. 4A and 5A, deflection pins 33, 33' upstanding from the rear portions of upper gripping means U, U' are fully engaged with oblique side lobes 35a and 35c of movable cam 35, constraining their forward ends (not visible here) into ungripping position—also forcing the lower gripping means into ungripping position (not visible here) by bearing against its stops 22, 22'.

In the deflected position of FIGS. 4B and 5B, deflection pins 33 and 33' are barely engaged by the cam lobes and have moved apart (as indicated by arrows) so as to enable the forward ends of upper gripping means U, U' to be biased by spring 31 toward one another into lid-gripping configuration, also enabling the forward ends of lower gripping means to be biased by spring 39 into gripping configuration. Further, middle lobe 35b, bearing on the raised neck of block 45, has depressed the block and lower gripping means L, L' (only the latter visible here) pivoted on the block by pins 27, 27' (latter visible), spacing the lower gripping means substantially below and apart from the upper gripping means, and into actuating contact with fixed cam 25 (shown previously, not shown here) to ungrip any lid gripped thereby.

FIGS. 6A through 6F show, in enlarged front elevation, a half dozen successive stages of this inventive method of dispensing lids one-by-one from a stack 30, identifying only topmost lid 30A (dashed lines), bottommost lid 30Z, and next overlying lid 30Y in the magazine of the dispensing apparatus of this invention. It will be understood that a multiplicity of lids intervenes between lid 30A and lid 30Y in the stack but are omitted to simplify the showing.

Figure 6A:
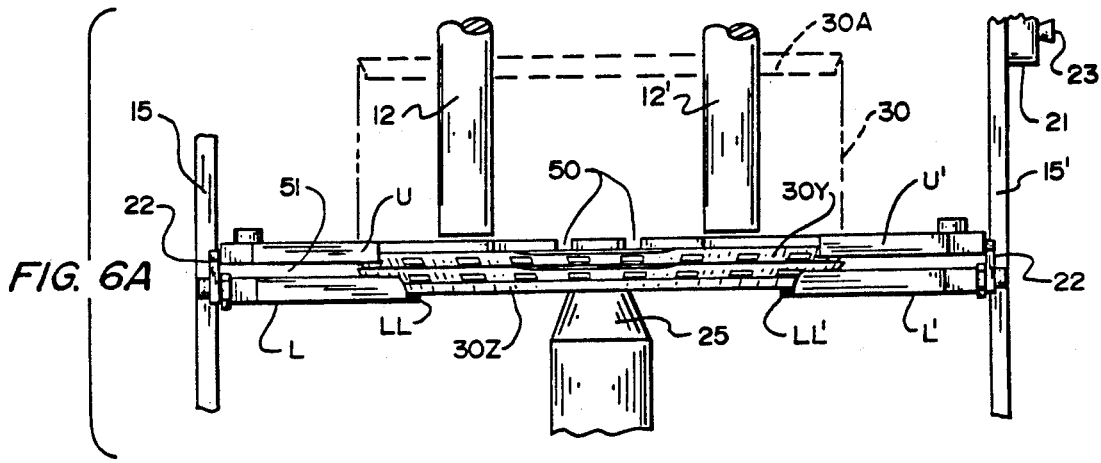
FIG. 6A is a fragmentary elevation of the same apparatus, with the bottommost lid resting on relaxed first gripping means, and with relaxed second gripping means straddling the next overlying lid.
Figure 6B:
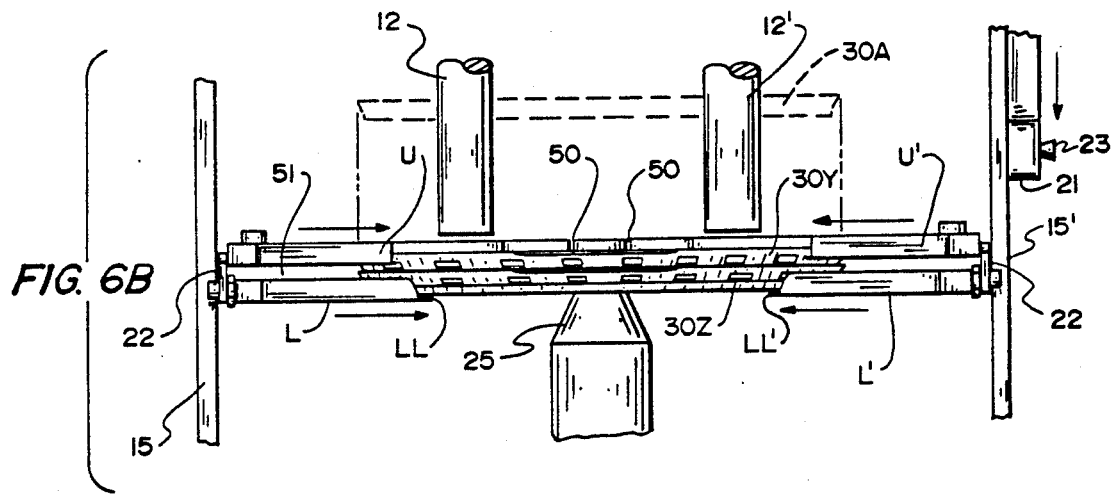
FIG. 6B is a fragmentary elevation of the apparatus with the bottommost lid and the next overlying lid laterally gripped by the first and second gripping means, respectively.
Figure 6C:
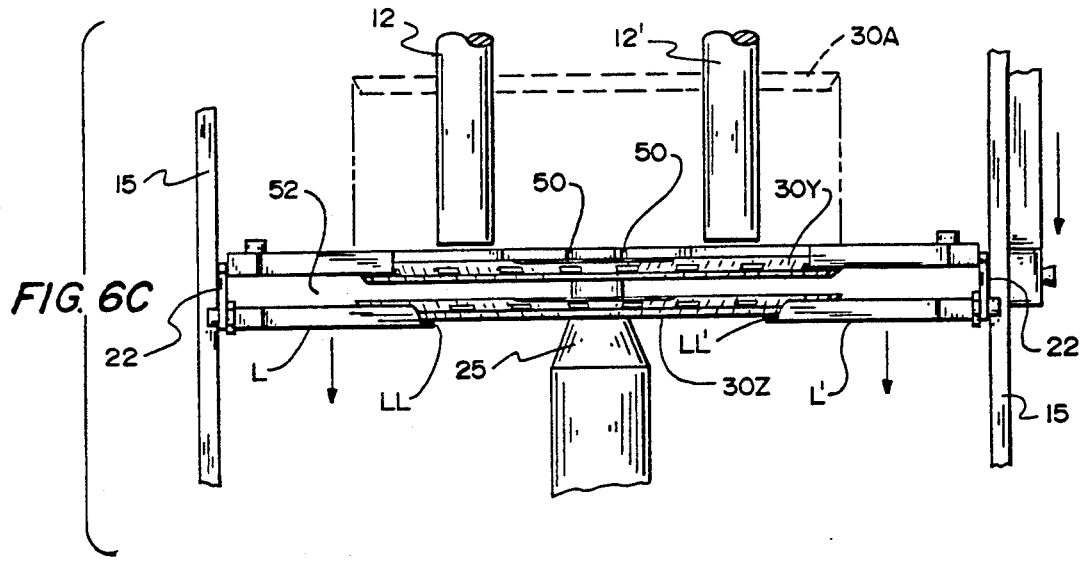
FIG. 6C is a fragmentary elevation of the apparatus with the bottommost lid and its gripping means spaced below the stack.
Figure 6D:
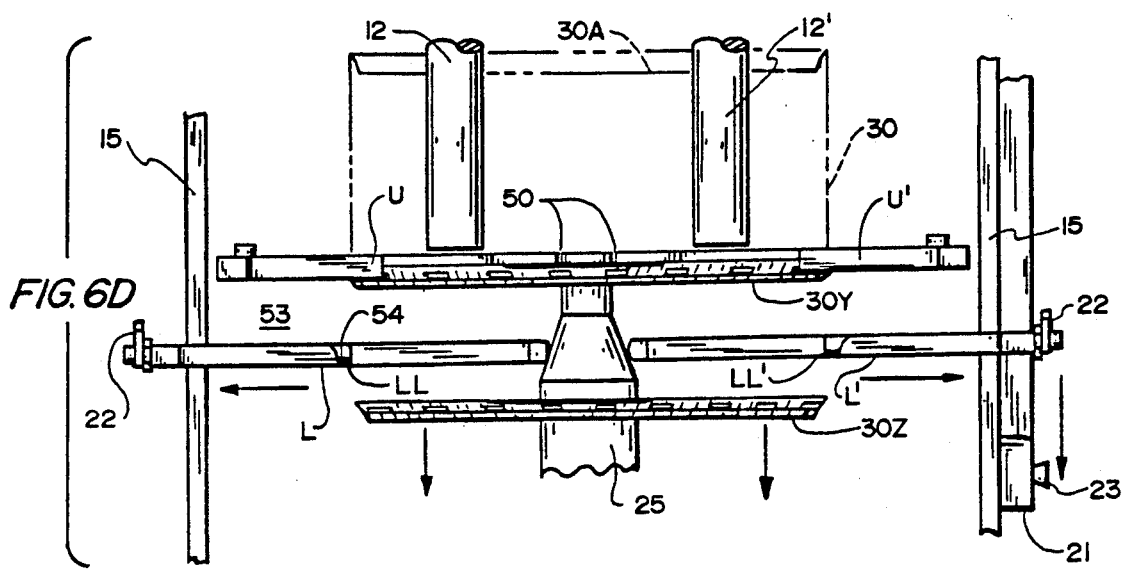
FIG. 6D is a fragmentary elevation of the apparatus with the first gripping means relaxed, enabling the bottommost lid to fall.
Figure 6E:
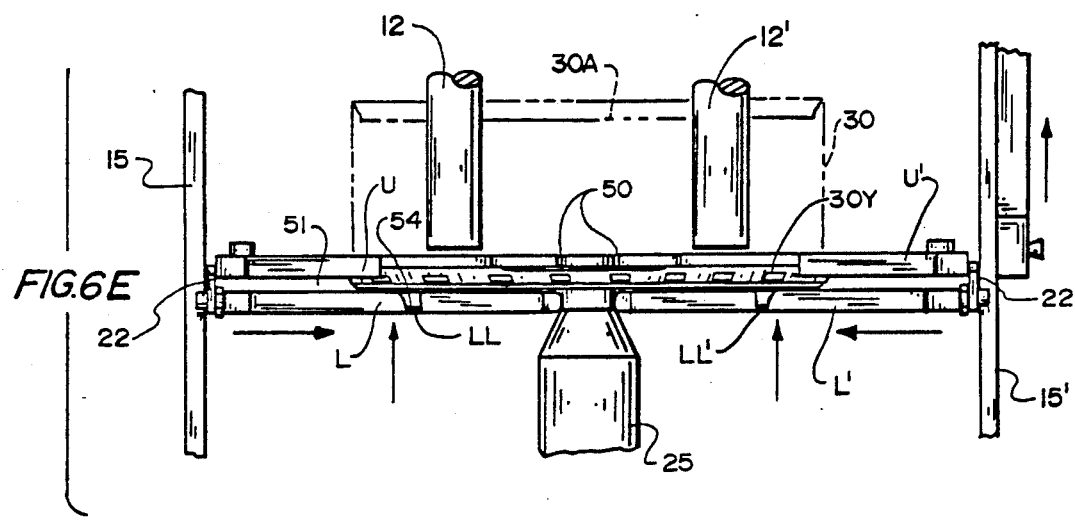
FIG. 6E is a fragmentary elevation of the apparatus with the first gripping means restored empty to its rest position.
Figure 6F:
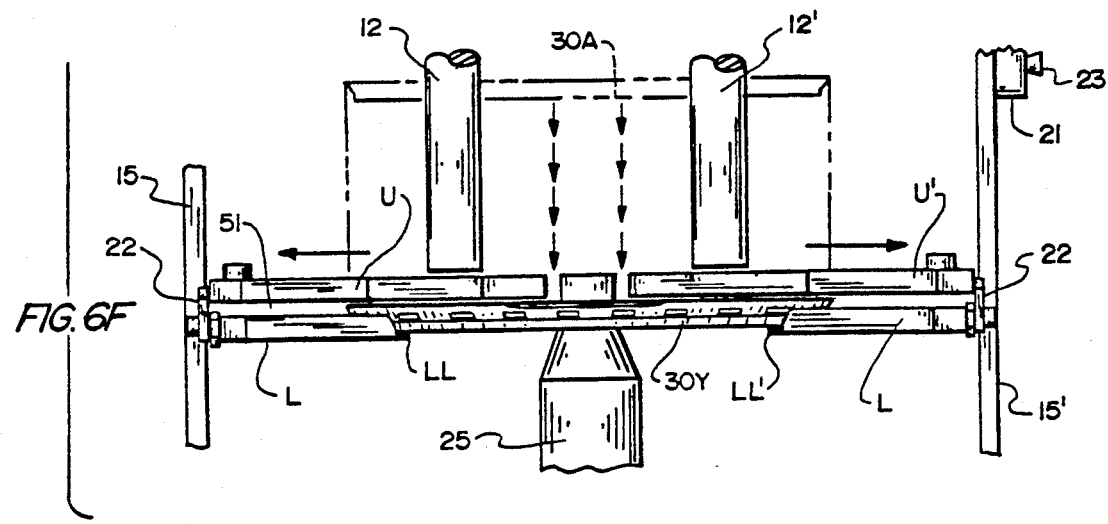
FIG. 6F is a fragmentary elevation of the apparatus with the second gripping means relaxed, allowing the stack of lids to settle onto the underneath support provided by the first gripping means.

This series of six successive stages includes the following: FIG. 6A. First stage ("rest")—handle up and gripping means neutral in ungripping position. Note gap 50 open between cylindrical upper part of upright fixed cam 25 and adjacent edges of upper gripping means U—also similar edges (hidden here) of lower gripping means L. Bottommost lid 30Z is supported underneath by flanges LL, LL' of ungripped lower gripping means U. All overlying lids (30A to 30Y) in the magazine are supported in a nested stack by resting together on bottommost lid 30Z, itself being supported underneath as just noted. FIG. 6B. Second stage—handle depressed partway, both upper and lower gripping means released by side lobes of movable cam (FIG. 5B) and each spring-biased into gripping position (note gap 50 closed). FIG. 6C. Third stage—handle depressed further, spacing the lower gripping means (and bottommost lid 30Z gripped thereby) downward apart from the upper gripping means-still gripping next overlying lid 30Y, now supporting the rest of the lids in the overlying stack. FIG. 6D. Fourth stage—handle fully depressed, lowering the lower gripping means down the tapered part of upright fixed cam 25 so as to be forced apart thereby enough to spread its underlying flanges out from underneath lid 30Z, enabling the lid to drop or fall free. FIG. 6E. Fifth stage—handle raised partway from its fully depressed position, raising the lower gripping means to its original support level, closing as it rises along the tapered part of the fixed cam. FIGS. 6F. Sixth stage—handle raised sufficiently to re-engage the movable cam, forcing the lower gripping means apart sufficiently to leave only the flanged portions underneath the magazine, and forcing the upper gripping means apart, whereupon lid 30Y is ungripped, so all the lids settle (short arrows) the thickness of one lid onto the lower gripping means flanges, as underlying support for the stack, thus completing one entire cycle of dispensing the lids one-by-one.

It is apparent from the foregoing description of the action of the apparatus of this invention that when operated, whether by hand or by electrical or other power, the following method steps occur:

(a) supporting from underneath, at a given level of underlying support, a stack of cup lids (or the like) slidable vertically;

(b) laterally gripping the bottommost lid in such stack of lids, and separately laterally gripping the lid next overlying such lid;

(c) lowering the bottommost lid and its underlying support level, thereby spacing it downward from the rest of the lids in the stack —meanwhile supported on the next overlying laterally gripped lid;

(d) ungripping the downwardly spaced lid and removing the underlying support therefrom, allowing it to drop free, below the stack;

(e) restoring underlying support at the given level, spaced apart from and a lid's thickness below the laterally gripped next lid; and (f) ungripping the next lid, allowing the stack to settle to the given level of underlying support, thereby completing one cycle of dispensing lids from the stack.

The method of this invention is so convenient and really fun to perform that it need not be automated. However, it may be switch-actuated by connecting a simple servo motor mechanically to the handle pivot and by providing a timed electrical output to the servo motor, repeatable upon demand, perhaps with a delay circuit included to match the lid-dispensing rate to a cup or drink dispensing rate.

The apparatus of this invention does not require any unusual materials or particular manufacturing skill. The structural and cam components may be made of steel or other metal, or of strong plastic, or even of ceramic. The springs are normally made of steel.

This invention will dispense such lids whether loaded into the stack right side up or upside down, but the latter usually provides better performance. In addition to lids already noted, good results are obtainable with a lid disclosed in the present inventor's copending patent application, Ser. No. 676,324 filed Feb. 28, 1991.

The advantages of convenience, cleanliness, and orderliness are apparent. These are significant benefits for both merchandisers and consumers of beverages for which such lids are customarily used.

Preferred embodiments and variants have been suggested for this invention. Other modifications may be made, as by adding, combining, deleting, or subdividing compositions, parts, or steps, while retaining all or some of the advantages and benefits of the present invention—which itself is defined in the following claims.

I claim:

1. Lid dispensing method, comprising these sequential steps:

supporting from underneath, at a given level of underlying support, a stack of cup lids or the like slidable vertically;

laterally gripping the bottommost lid in such stack of lids, and separately laterally gripping the lid next overlying such lid;

lowering the bottommost lid and its underlying support level, thereby spacing it downward from the rest of the lids in the stack meanwhile supported on the next overlying laterally gripped lid, ungripping the downwardly spaced lid and removing the underlying support therefrom, allowing it to drop free, below the stack, restoring underlying support at the given level, spaced apart from and a lid's thickness below the laterally gripped next lid; and ungripping the next lid, allowing the stack to settle to the given level of underlying support, thereby completing one cycle of dispensing lids from the stack.

2. Method according to claim 1, performed upon plastic cup lids or the like having a flangelike peripheral skirt adapted to fit down onto such a cup and further adapted for lateral gripping.

3. Method according to claim 2, including loading the lids into the magazine upside down relative to their use orientation.

4. Lid dispensing apparatus, comprising a magazine adapted to hold a stack of lids slidable vertically, first gripping means adapted to underlie partially and thereby support the bottommost lid and whatever other lids in such stack are resting thereon, and adapted to move downward from a given level and back to such given level, and further adapted to grip and to ungrip the bottommost lid laterally, in a sequence of dispensing steps, second gripping means adapted to grip and to ungrip laterally in the sequence the lid next overlying the bottommost lid, and means for sequencing the action of the foregoing means so as to dispense the lids one-by-one from the bottom of the stack.

5. Lid dispensing apparatus according to claim 4, wherein the sequencing means is operative to provide the following sequence:
- the first gripping means grips the bottommost lid in the stack, and the second gripping means grips the next lid in the stack;
- the first gripping means moves downward from the given level and thereby separates the bottommost lid from the stack, and then ungrips the lid, enabling it to fall free of the stack;
- the first gripping means returns to the given level and to its partial underlying position adapted to support the bottommost lid in the stack; and
- the second gripping means ungrips the next lid, now bottommost in the stack, whereupon the stack settles by the thickness of a lid onto the partially underlying first gripping means.

6. Dispenser for plastic cup lids, having a base mounting
- a substantially vertical magazine openable at the top so as to accommodate therein a stack of cup lids,
- supporting means adapted to underlie the bottommost lid in the stack at least partially and thereby to support such lid and all the lids above it in the stack when resting on the bottommost lid,
- lateral gripping means adapted to grip and ungrip lids in the stack, including the bottommost lid and the lid next above it, and
- means sequencing the gripping means and thereby enabling the lids to be dispensed, one-by-one from the bottom of the stack.

7. Cup lid dispenser according to claim 6, including a pair of lateral gripping means located to grip, respectively, the bottommost lid and the lid next above it in the stack, each individually.

8. Cup lid dispenser according to claim 7, wherein the gripping means for the bottommost lid is combined with the supporting means adapted to underlie it at least partially and to support it in the stack without laterally gripping it.

9. Cup lid dispenser according to claim 8, including cam means adapted to sequence the gripping and ungripping of lids in the stack by the pair of gripping means in such manner as to dispense the bottommost lid in the stack apart from the other lids therein.

10. Cup lid dispenser according to claim 9, wherein the cam means is adapted to sequence the pair of gripping means as follows:
- the first gripping means grips the bottommost lid in the stack, and the second gripping means grips the next lid in the stack;
- the first gripping means moves downward and thereby separates the bottommost lid from the stack, and then ungrips the lid and also removes underlying support from it, enabling it to fall free;
- the first gripping means returns to its original partial underlying position adapted to support the bottommost lid in the stack;
- the second gripping means ungrips the next lid, now bottommost in the stack, whereupon the stack settles by the thickness of a lid onto the partially underlying first gripping means.

11. In a method of dispensing cup lids from the bottom of a substantially vertical stack thereof supported by underlying means at a given support level, the improvement comprising the steps of
- stacking the lids nested and inverted from their use position,
- laterally gripping the lid next overlying the bottommost lid, before taking steps to release the bottommost lid from the stack by temporarily removing the underlying supporting means therefrom, then
- replacing the underlying supporting means at the given support level, before ungripping the next lid, thereby enabling the stack to settle by one lid's thickness to the given support level.

12. Lid dispensing apparatus comprising
- a substantially vertical magazine adapted to hold stacked lids,
- stack-supporting means removably underlying the bottommost lid,
- laterally gripping means at the level of the bottommost lid,
- laterally gripping means at the level of the next lid,
- means to grip the respective aforesaid lids laterally,
- means to lower the stack-supporting means and the bottommost lid gripping means while the next overlying lid is so gripped,
- means to ungrip the bottommost lid to fall free of the stack,
- means to replace the underlying stack-supporting means at the given level, and
- means to ungrip the aforesaid next lid, now the bottommost lid in the stack and thereby allow the stack to settle by the thickness of the removed lid onto the stack-supporting means.

* * * * *